United States Patent [19]

Meyer

[11] Patent Number: 5,788,024
[45] Date of Patent: Aug. 4, 1998

[54] ACTUATOR FOR A VEHICLE BRAKE, ESPECIALLY A DISC BRAKE

[75] Inventor: Manfred Meyer, Gillenfeld, Germany

[73] Assignee: Lucas Industries public limited co., West Midlands, United Kingdom

[21] Appl. No.: 726,516

[22] Filed: Oct. 7, 1996

[30] Foreign Application Priority Data

May 6, 1994 [DE] Germany ..................... 9407623 U

[51] Int. Cl.⁶ ........................................... F16D 65/56
[52] U.S. Cl. .............................. 188/72.7; 188/72.8
[58] Field of Search ...................... 188/72.1, 72.7, 188/72.8, 106 F; 192/110 R, 110 B

[56] References Cited

U.S. PATENT DOCUMENTS

| 3,747,711 | 7/1973 | Burnett .................... 188/71.9 |
| 5,060,765 | 10/1991 | Meyer ..................... 188/71.9 |

FOREIGN PATENT DOCUMENTS

| 0402835A1 | 6/1990 | European Pat. Off. . |
| 0403635B1 | 7/1990 | European Pat. Off. . |
| 2142512 | 1/1973 | France . |
| 2229237 | 12/1972 | German Dem. Rep. . |
| 3405027A1 | 8/1985 | German Dem. Rep. . |

*Primary Examiner*—Robert J. Oberleitner
*Assistant Examiner*—C. T. Bartz
*Attorney, Agent, or Firm*—Wood, Herron & Evans, L.L.P.

[57] ABSTRACT

A shaft (34) is supported in the bottom (22) of a casing (20) and is rotatable for mechanical brake application. A ramp assembly (40) which is fixed to the casing and designed as an annular plate is supported on the bottom (22) around the shaft (34) and prevented from rotating by an off-center twist stop (42), and it is centered in the casing (20) in a way bypassing the shaft (34). Moreover, a rotatable ramp assembly (50) is arranged inside the casing (20) so as to be axially displaceable and is connected to the shaft (34) for torque transmission. The rotatable ramp assembly (50) is supported in such manner on the ramp assembly (40) which is fixed to the casing that it converts torque applied to it by the shaft (34) into an axial actuating force (B).

4 Claims, 3 Drawing Sheets

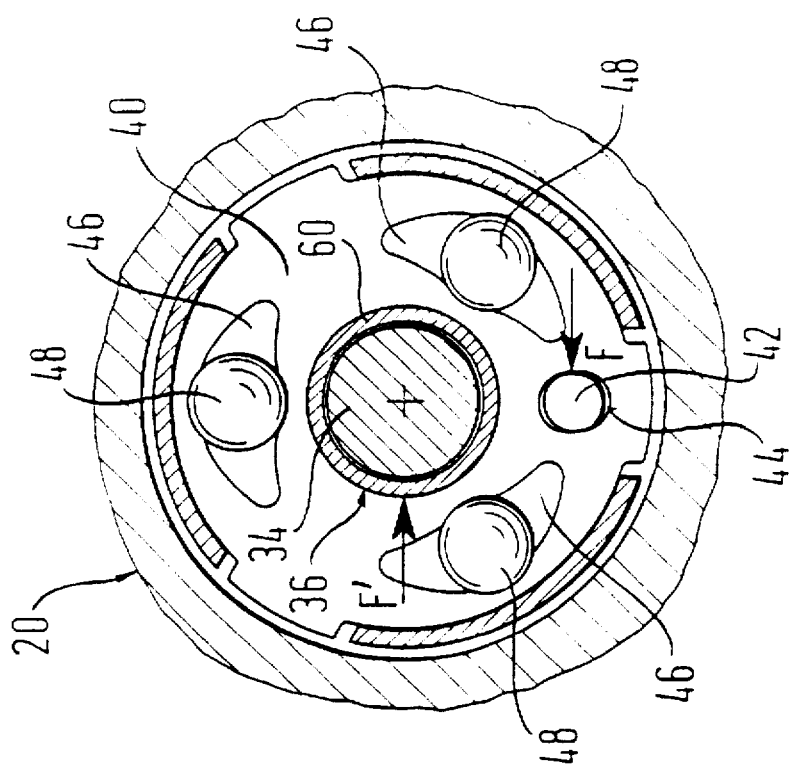
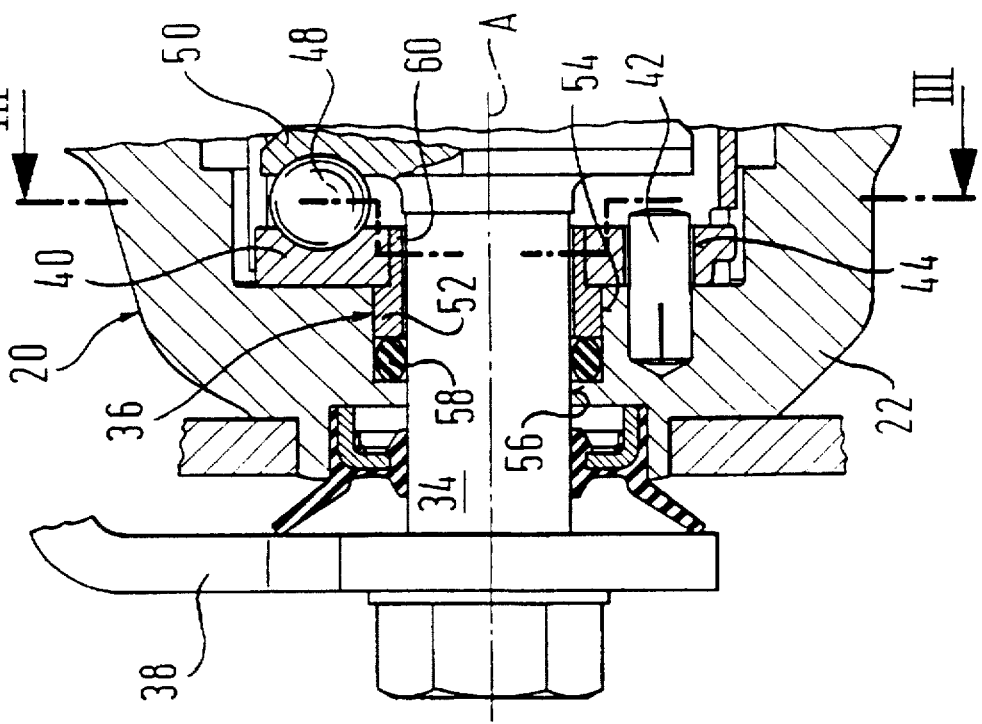

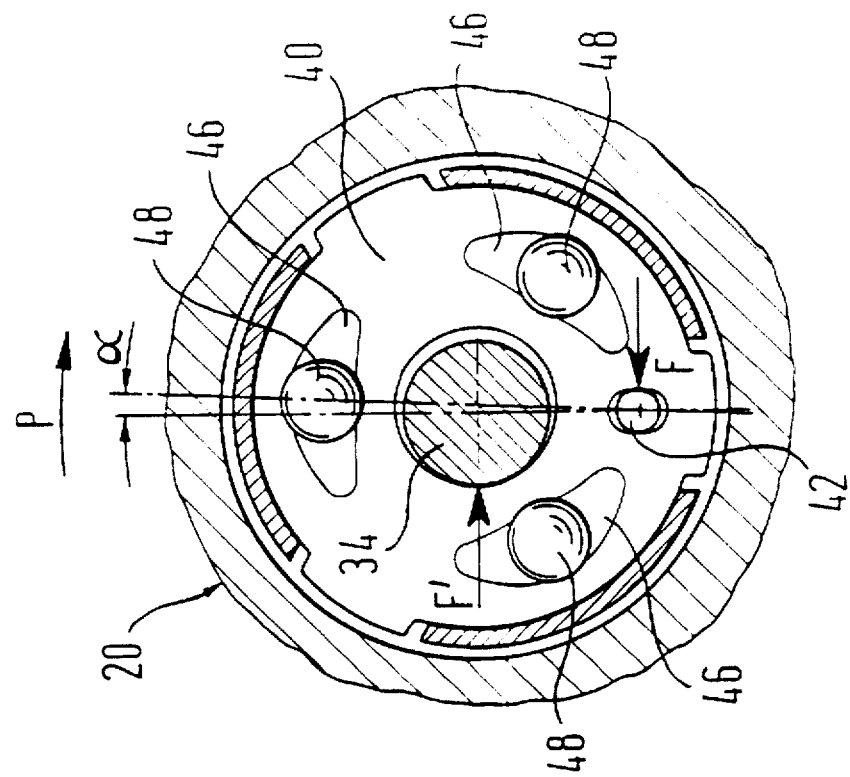
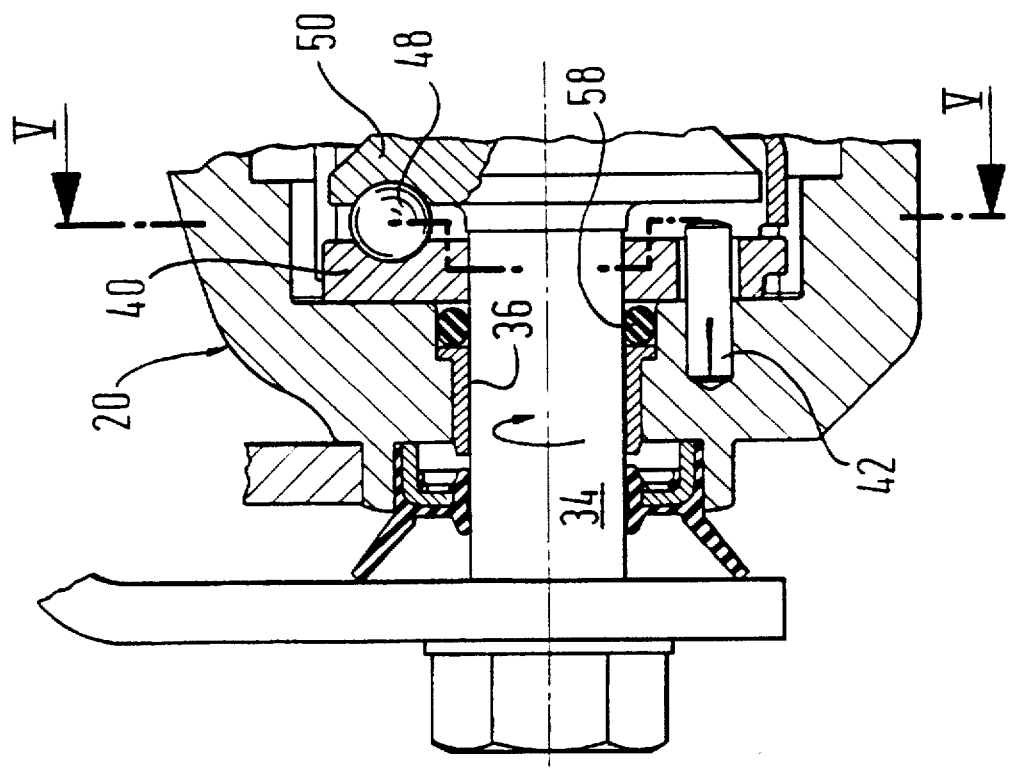

ACTUATOR FOR A VEHICLE BRAKE, ESPECIALLY A DISC BRAKE

This is a continuation of PCT patent application No. EP95/01274 filed Apr. 7, 1995 which in turn was based on German Patent Application No. G9407623.5 filed May 6, 1994.

The instant invention relates to an actuator for a vehicle brake, especially a disc brake, comprising a casing which has a bottom, a shaft which is supported in the bottom of the casing and rotatable for mechanical brake application, a ramp assembly which is fixed to the casing and designed as an annular plate, supported on the bottom around the shaft, and prevented from rotating by an off-center twist stop, and a rotatable ramp assembly which is arranged for axial displacement in the casing and connected to the shaft for torque transmission, being supported in such manner on the ramp assembly fixed to the casing that it converts torque applied to it by the shaft into an axial actuating force.

An actuator of this kind is known from EP 0 403 635 B1. There, an eccentric twist stop for the ramp assembly fixed to the casing is provided either in the form of a pin produced by embossing and engaging in a blind bore formed parallel to the axis in the bottom of the casing or a paraxial pin which has been driven into a blind bore in the bottom of the casing and engages in an aperture which is oblong in radial direction of the ramp assembly fixed to the casing. In both cases the shaft passes directly through the ramp assembly which is fixed to the casing and is embodied by an annular plate. As a consequence, this ramp assembly rests directly on the shaft once radial clearance has been overcome that is unavoidable for manufacturing reasons and, upon brake actuation, it may accommodate the moment of reaction which is exerted on the ramp assembly fixed to the casing. This reaction torque is proportional, in first approximation, to the actuating torque introduced through the shaft and may reach a magnitude at which the force by which the ramp assembly fixed to the casing supports itself on the shaft gives rise to considerable frictional resistance against any further rotation of the shaft. The efficiency of the known actuator this is noticeably reduced. Moreover, since the ramp assembly fixed to the casing does not come to be supported on the shaft until after radial clearance has been overcome, the ramps with which this assembly is formed and which usually are shaped essentially like circular arcs, will adopt an eccentric position at which they no longer are aligned precisely with corresponding ramps presented in the rotatable ramp assembly. For this reason, roller bodies, such as balls normally placed between ramps which are mutually opposed in axial direction, no longer are supported, as intended, on base surfaces but instead on lateral flanks of the ramps. That causes additional losses due to friction and this in turn entails wear, just like the friction between the shaft and the ramp assembly which is fixed to the casing. As a result, the efficiency of the actuator is reduced.

It is, therefore, an object of the instant invention to improve an actuator of the kind specified such that it will have a higher degree of efficiency and be less prone to wear.

The object is met, in accordance with the invention, in that the ramp assembly which is fixed to the casing is centered in the casing, bypassing the shaft.

In this manner the shaft is kept free of transverse forces which so far were transmitted to the shaft from the ramp assembly fixed to the casing. The centering of the ramp assembly fixed to the casing remains unaffected by the unavoidable bearing clearance of the shaft and, therefore, can be more precise than is the case with the conventional actuator of the generic type in question. For this reason the ramps formed, on the one hand, in the ramp assembly fixed to the casing and, on the other hand, in the rotatable ramp assembly will remain better centered with respect to each other also when high actuating forces are exerted, and consequently be less subjected to wear, regardless of whether these ramps cooperate in pairs directly or through roller bodies in-between.

An embodiment of the invention with which the ramp assembly that is fixed to the casing is centered on a bearing bush by means of which the shaft is supported in the bottom of the casing has proved to be particularly advantageous. Double utilization of the bearing bush for support of the shaft, on the one hand, and for centering of the ramp assembly fixed to the casing, on the other hand, keeps the costs of manufacture and assembly of the bearing bush and of the ramp assembly fixed to the casing at the same level as those of the conventional actuator. And, on top of that, it is exceptionally easy to slip or press this ramp assembly in tight fit on the bearing bush outside of the casing in order to then insert both of them into the casing in a single operation, the bearing bush itself being pushed or pressed in tight fit into a bore in the bottom of the casing. In this context it is especially advantageous if the bearing bush has one portion of smaller outer diameter which engages in the ramp assembly that is fixed to the casing and another portion of greater outer diameter which is received in the bottom of the casing.

An embodiment of the invention will be described in greater detail below as compared to the prior art from which it is started and with reference to diagrammatic drawings, in which:

FIG. 2 shows an enlarged cutout of FIG. 1;

FIG. 3 is cross section III—III of FIG. 2;

FIG. 4 shows a cutout similar to FIG. 2 of a conventional actuator, and

FIG. 5 is cross section V—V in FIG. 4.

Figure 1:
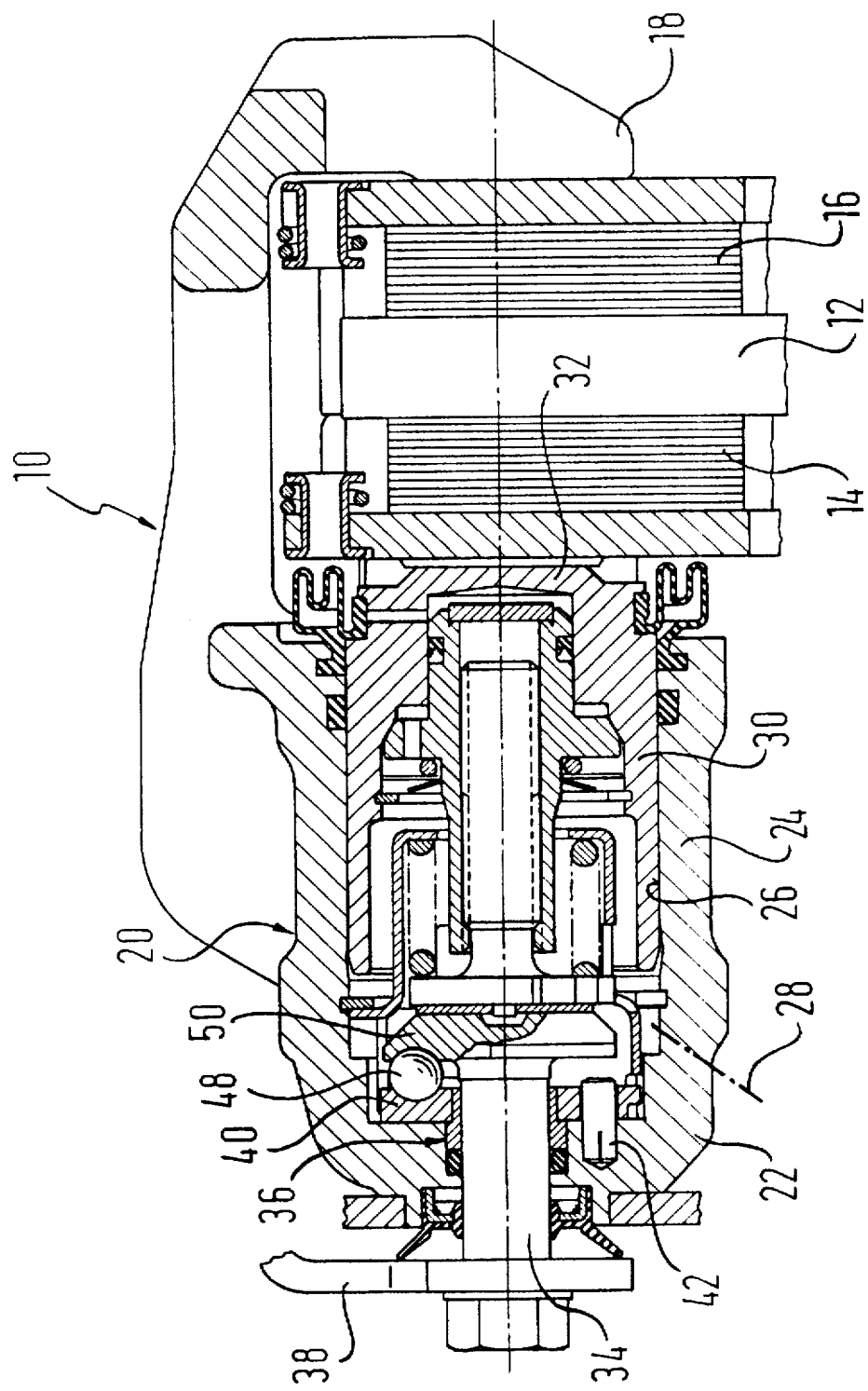
FIG. 1 is an axial sectional elevation of a spot type disc brake comprising an actuator according to the invention.

The actuator presented in FIGS. 1 to 3 is installed in a floating caliper 10 which forms part of a spot type disc brake and is guided in conventional manner on a brake carrier (not shown) so as to be displaceable parallel to the axis of a brake disc 12. The floating caliper lo straddles the brake disc 12 as well as two brake pads 14 and 16 of which the first one 14 is adapted to be pressed directly by the actuator against the brake disc 12. That gives rise to forces of reaction which displace the floating caliper 10 such that an integral leg 18 thereof makes sure that also the second brake pad 16 is urged against the brake disc 12.

The actuator comprises a casing 20 which is made in one piece, for instance by casting, and includes a bottom 22 and a shell 24 formed with a cylindrical bore 26 which is open towards the brake disc 12 and with an inlet passage 28 which will connect to a master brake cylinder. A cup-shaped piston 30 having a closed outer face end wall 32 with a surface for abutment of the brake pad 14 is guided in the cylindrical bore 26.

A shaft 34 for mechanical brake actuation is supported so as to be rotatable and axially displaceable in a bearing bush 36 in the bottom 22 of the casing and coaxially with the piston 30. A lever 38 attached to the outer end of the shaft 34 normally is connected, for example, by a Bowden cable to a parking brake lever or pedal. A ramp assembly 40 fixed to the casing and embodied by an annular plate which is seated in the bearing bush 36 in press fit and centered on the same with respect to the casing 20 rests against the inside surface of the bottom 22 of the casing, without touching the shaft 34. A twist stop 42 prevents rotation of the ramp assembly 40 which is fixed to the casing. In the embodiment illustrated, the twist stop 42 is embodied by a notched nail driven into a bore in the bottom 22 of the casing and engaging with radial clearance in an off-center aperture 44 in the ramp assembly 40 which is fixed to the casing.

The ramp assembly 40 fixed to the casing is formed with three trough-like ramps 46 which are elongate in circumferential direction and each receives a spreader 48 of spherical shape in the embodiment shown. The spreaders 48 each cooperate with a corresponding ramp and with an adjustable ramp assembly 50 likewise of annulus configuration. In the present embodiment this ramp assembly 50 is formed in one piece with the shaft 34. In this respect, and as regards further features, the actuator shown corresponds to the one known from FIGS. 9 to 12 of EP 0 403 635 B1 mentioned above.

The centering on the bearing bush 36 of the ramp assembly 40 fixed to the casing, which centering differs from the known actuator, is illustrated in greater detail in FIGS. 2 and 3. The bearing bush 36 has an inner diameter which is greater by a bearing clearance in the order of magnitude of 0.25 mm than the outer diameter of that portion of the shaft 34 which is received in the bearing bush 36. The bearing bush 36 is stepped at the outside; a portion 52 of greater outer diameter is received with little clearance, preferably none at all, in a widened portion 54 of a stepped bore in the bottom 22 of the casing and, together with a narrower outer portion 56 of this stepped bore, defines a space in which a sealing 58 is received. The bearing bush 36 further has a portion 60 of smaller outer diameter on which the ramp assembly 40 which is fixed to the casing is seated in press fit.

Upon rotation of the shaft 34 and consequently also of the adjustable ramp assembly 50, for mechanical actuation of the brake by means of the lever 8, the spreaders 48 roll along their ramps 46 which rise in circumferential direction. As a result, the adjustable ramp assembly 50 is urged away from the ramp assembly 40 which is fixed to the casing, i.e. to the right in FIGS. 1 and 2. At the same time, the spreaders 48 exert forces of reaction on the ramp assembly 40 fixed to the casing. These forces of reaction may be divided into components which act in parallel with the axis, urging the ramp assembly 40 against the bottom 22 of the casing, and in to circumferential components whose moment with respect to axis A of the actuator may be represented as force couple F, F', as indicated in FIG. 3. Force F is taken up by the twist stop 42 and passed on into the bottom 22 of the casing.

Force F' is taken up by the bearing bush 36 and likewise passed on into the bottom 22 of the casing without effecting the shaft in any way.

By way of comparison, FIGS. 4 and 5 illustrate the structural disposition and the resulting operating conditions of the conventional actuator according to EP 0 403 635 B1. With this arrangement, too, the reaction force F occurring upon brake application and acting in circumferential direction on the ramp assembly 40 is taken up by the twist stop 42. The counterforce F' of the same magnitude, however, acts from the ramp assembly 40 fixed to the casing on the shaft 34 which then transmits it through the bearing bush 36 to the bottom 22 of the casing. Because of the unavoidable radial clearance with which the shaft 34 passes through the ramp assembly 40, this ramp assembly 40 fixed to the casing is pivoted about the twist stop 42 by the force F', as indicated by arrow P in FIG. 5. The resulting pivot angle α, in practice, may be an angle of 1.5°. As a result, the ramps 46 of the ramp assembly 40 fixed to the casing become shifted with respect to the corresponding ramps of the adjustable ramp assembly 50. In this context it is especially disadvantageous that the ramps of matching pairs become twisted with respect to each other about the eccentrically disposed twist stop 42 rather than the central axis A so that they no longer can cooperate exactly as intended with the spreaders 48. This undesirable twisting and the likewise undesired influence of force F' on shaft 34 are excluded with the arrangement according to FIGS. 1 to 3.

I claim:

1. An actuator for a vehicle brake, comprising
   a casing (20) which has a bottom (22),
   a shaft (34) which is supported in the bottom (22) of the casing and is rotatable for mechanical brake application,
   a ramp assembly (40) which is fixed to the casing and designed as an annular plate, supported on the bottom (22) around the shaft (34), and prevented from rotating by an off-center twist stop (42), and
   a rotatable ramp assembly (50) which is arranged for axial displacement in the casing (20) and connected to the shaft (34) for torque transmission, being supported in such a manner on the ramp assembly (40) which is fixed to the casing that it converts torque applied to it by the shaft (34) into an axial actuating force, characterized in that the ramp assembly (40) which is fixed to the casing is centered on and contacts a bearing bush (36) which also directly contacts the casing by which the shaft (34) is supported in the bottom (22) of the casing.

2. The actuator as claimed in claim 1, characterized in that the ramp assembly (40) which is fixed to the casing establishes a tight fit with the bearing bush (36).

3. An actuator for a vehicle brake, comprising
   a casing (20) which has a bottom (22),
   a shaft (34) which is supported in the bottom (22) of the casing and is rotatable for mechanical brake application,
   a ramp assembly (40) which is fixed to the casing and designed as an annular plate, supported on the bottom (22) around the shaft (34), and prevented from rotating by an off-center twist stop (42), and
   a rotatable ramp assembly (50) which is arranged for axial displacement in the casing (20) and connected to the shaft (34) for torque transmission, being supported in such a manner on the ramp assembly (40) which is fixed to the casing that it converts torque applied to it by the shaft (34) into an axial actuating force, characterized in that the ramp assembly (40) which is fixed to the casing is centered on a bearing bush (36) by which the shaft (34) is supported in the bottom (22) of the casing, wherein the bearing bush (36) comprises a portion (60) of smaller outer diameter which engages in the ramp assembly (40) being fixed to the casing and a portion (52) of greater outer diameter which is received in the bottom (22) of the casing.

4. The actuator of claim 1 wherein the bearing bush (36) is concentrically mounted upon both the shaft (34) and the ramp assembly (40) and in contact with the ramp assembly (40).

* * * * *